Sept. 1, 1970 N. McPHAIL 3,526,489
BENDING OF GLASS SHEETS
Filed April 21, 1967 2 Sheets-Sheet 1

Inventor
Neil McPhail
By
Morrison, Kennedy & Campbell
Attorneys

Sept. 1, 1970
N. McPHAIL
3,526,489
BENDING OF GLASS SHEETS
Filed April 21, 1967
2 Sheets-Sheet 2
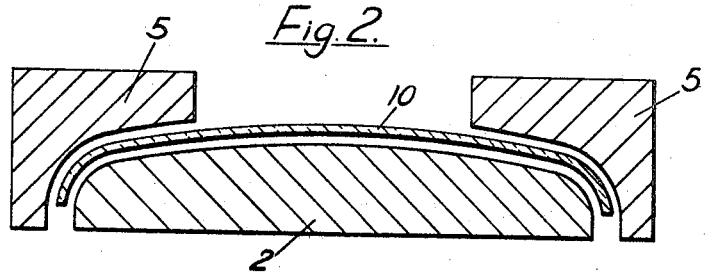
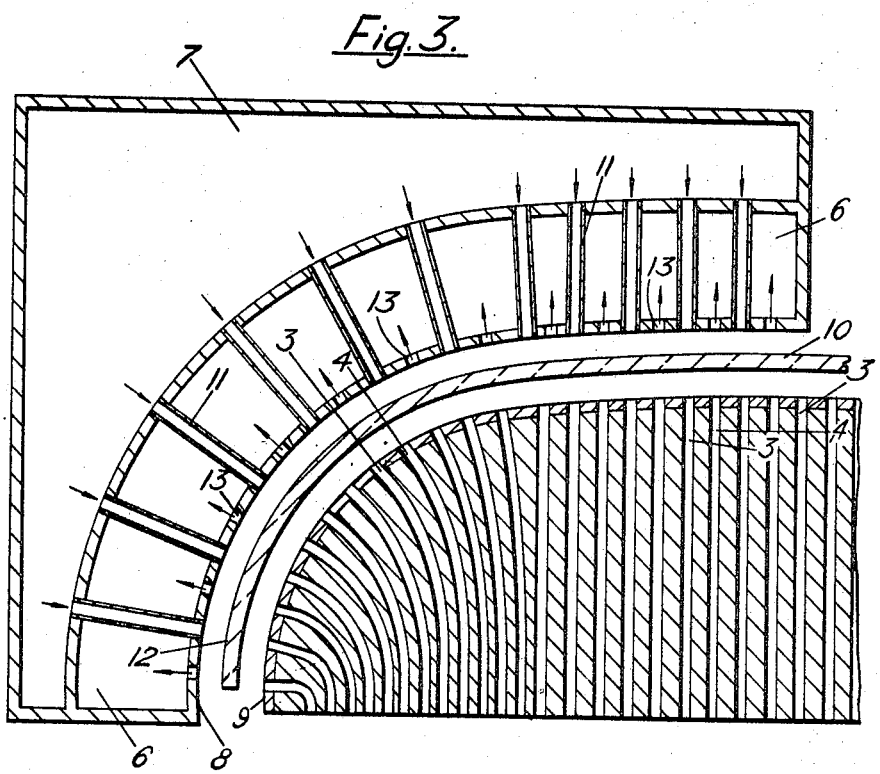
Inventor
Neil McPhail
By
Morrison, Kennedy & Campbell
Attorneys United States Patent Office 3,526,489
Patented Sept. 1, 1970

3,526,489
BENDING OF GLASS SHEETS
Neil McPhail, Windle, St. Helens, England, assignor to Pilkington Brothers Limited, Liverpool, England, a corporation of Great Britain
Filed Apr. 21, 1967, Ser. No. 632,796
Claims priority, application Great Britain, Apr. 25, 1966, 18,073/66
Int. Cl. C03b 39/00
U.S. Cl. 65—25                                                 6 Claims

ABSTRACT OF THE DISCLOSURE

A glass sheet is supported on a gaseous support as it is advanced through a heating station and during the continued advance of the sheet a greater downwardly directed pressure difference is created across the margins than across the central area of the sheet so that the margins are bent downwardly.

CROSS-REFERENCES TO RELATED

U.S. patent application Ser. No. 534,481 and U.S. patent application Ser. No. 632,794 of even date.

BACKGROUND OF THE INVENTION

Field of the invention

This invention relates to methods and apparatus for bending glass in sheet form and has for its main object to improve the methods and apparatus for bending sheet glass which is transported on a gaseous support constituted by a cushion of gas, usually air, under pressure which is created over an apertured bed by an advancing sheet of glass, the bed being formed with outlets through which gas is released into the cushion and through which gas is exhausted from the cushion in such manner that the gas is uniformly supported by the gaseous support as it passes along the bed.

Description of the prior art

U.S. Pat. No. 1,622,817 shows a bed, which may be flat or curved, through which ducts for the supply of gas open at the surface of the bed and adjacent ducts lead gas away from the surface of the bed either to atmosphere or to a chamber at negative pressure, the arrangement of adjacent supply and gas release ducts being such that glass passing over the bed is uniformly supported so that the glass retains its pristine condition during transit over the bed.

In U.S. patent application Ser. No. 534,481, now abandoned, there is described and claimed a method of imposing a desired configuration on glass in sheet form by the creating of a pneumatic pressure difference across the thickness of a part of the area of the heated glass sheet, which pressure difference is sufficient to bend that area of the glass sheet to a desired configuration. Further in co-pending U.S. patent application No. 632,794 of even date there is described apparatus for transporting glass in sheet form on a gaseous support through heating stations, the glass being urged over a gaseous support created over a bed as the glass advances over the bed, the bed being shaped so that a desired configuration or bend is imposed on the glass as it is advanced through the heating stations to a quenching station.

It is the main object of the present invention to provide an improvement in the bending of glass sheets in order to provide flexibility both in the shapes of glass sheets which can be produced and in the temperature of the heating stations through which the glass sheets are transported.

SUMMARY

According to the invention a method of imposing a desired configuration on glass in sheet form, which glass is supported on a gaseous support as it is advanced through a heating station, is characterised by bending the sheet to a desired configuration by progressively imposing across the thickness of the glass as it is advanced a pneumatic pressure difference which varies over the width of the glass sheet.

Thus the glass is progressively bent to the desired configuration as it is advanced, variations in the amount of bend being imposed across the width of the sheet by the variation in the pneumatic pressure difference.

The invention is particularly applicable to the manufacture of bent and toughened glass sheets which have a greater curvature at their margins than in a central area of the sheet, in particular in the production of "Wrap-Around" glasses for use as the windscreens and rear lights of automobiles. From this aspect in a method according to the invention a greater downwardly directed pneumatic pressure difference is created across the margins than across the central area of the glass sheet so that the margins of the sheet are bent downwardly to the desired configuration.

The reference to glass in sheet form comprehends flat glass or flat glass which has undergone a preliminary bending operation so that it already has a concave or convex form. Accordingly the first part of the apertured bed may be flat or curved to match the configuration of the glass to be transported through the heating stages.

In a preferred embodiment of the invention which is particularly applicable to the manufacture of "Wrap-Around" windscreens and rear lights for automobiles a method of bending a glass sheet to a desired shape comprises advancing the glass sheet through heating stations along a gaseous support created under the advancing sheet, and imposing an enhanced curvature on the sides of the sheet by adapting the source of the gaseous support to a progressive downward curve at its sides, and applying pneumatic pressure over the sides of the advancing glass sheet to force them progressively into a downward curvature conforming with the downward curve of the source of gaseous support as the sheet is advanced over the support.

After the desired shape has been enforced on the sheet in this way the advance of the sheet is continued over an extension of the gaseous support conforming to the final configuration of the sheet, to a quenching station in which the glass sheet glides over a gaseous support constituted by the quenching air supplied to the gaseous support for glass sheet at the same time as quenching air is fed downwardly from above.

The invention also comprehends apparatus for transporting glass in sheet form on a gaseous support through heating stations, characterised by a bed over which a gaseous support is created as a sheet is urged thereover, the bed having a top surface which is shaped so as to permit the glass to assume a desired curvature and including a transition surface which permits a progressive change of shape on the hot advancing sheets of glass, and whose transverse cross section progressively changes in such a way that there is a sharp progressive downward curvature of the surface of the bed corresponding to the desired sharp downward curve of the margins of the bent glass sheet, and gas supply means mounted above the margins of this transition surface of the bed for creating cushions of gas over the upper surface of the margins of the glass sheets so as to force the margins of the glass downwardly into said progressive downward curvature.

By this means it is not only possible to produce a much sharper curvature in the edges of the glass sheet by the continuous moulding of the margins of the sheet between the gaseous support and the gas pressure pressing downwardly on top of the sheet as the glass is advanced, but also it is possible to enforce a desired curvature on the sheet given a suitable shaped bed above which a gaseous support is created at a much lower temperature than has been possible in those methods and apparatus in which curvature is produced in a hot glass sheet advancing over a gaseous support by permitting the sheet to sag downwardly under a gravity to a desired shape.

In a preferred embodiment of the invention the gas supply means comprises pressure headers mounted above the margins of the transition surface of the bed, each having a lower face complementary to the marginal shape of the transition block so as to define between the lower faces of the pressure headers and the margins of the transition block, a downwardly curved space having the desired sharp curvature to be imposed on the margins of the advancing sheet of glass, the lower faces of the pressure headers being apertured for release of hot gases into a gaseous cushion which applies pneumatic pressure over the sides of the advancing glass.

BRIEF DESCRIPTION OF THE DRAWINGS

In order that the invention may be more clearly understood an embodiment thereof will now be described, by way of example, with reference to the accompanying diagrammatic drawings in which:

FIG. 2 is a sectional view through the bed on line II—II of FIG. 1 and showing the disposition of upper gas supply means disposed above both margins of the transition block of FIG. 1, and FIG. 3 is an enlarged sectional view of one side of the apparatus shown in FIG. 2.

Figure 1:
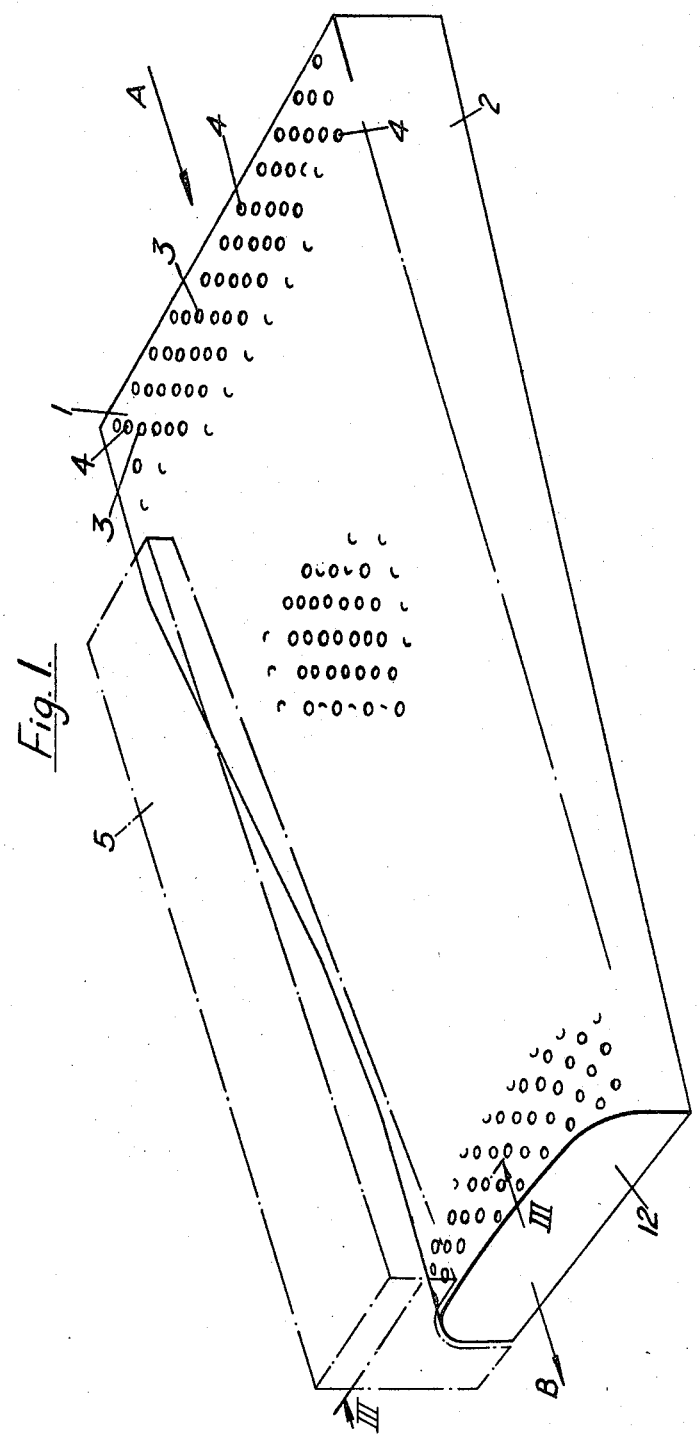
FIG. 1 is a pictorial view of a transition block forming a part of a bed over which a gaseous support is created as a sheet of glass is advanced over the bed.

In co-pending U.S. pat. application Ser. No. 632,794 of even date there is described and illustrated apparatus for transporting glass in sheet form on a gaseous support through heating stations including a bed over which the gaseous support is created as a sheet of glass is urged thereover. The bed comprises a base plate which is uniformly apertured for the passage of hot gases through the plate and which forms a roof of an exhaust chamber. The base plate is provided with equally interspersed openings communicating with the exhaust chamber to permit regulated exhaust of gases. The upper surface of the plate is formed to receive in intimate engagement the lower faces of a series of removable blocks whose upper surfaces define the desired bed surface and in which are provided gas escape and exhaust apertures in register with the apertures in the base plate so that the gaseous support created as the glass passes over the bed surface is adaptable by building up the bed surface to give a transverse pressure distribution which permits the hot glass to assume a desired form.

In the preferred embodiment of that apparatus the bed is built up to define first a flat upper surface for the support of flat sheets of glass to be bent. Then follows an interchangeable transition block which has an upper transition surface which causes the shape of the hot deformable glass to change progressively towards a desired curved shape prior to the advance of the curved glass from the transition surface to a final part of the bed also constituted by a number of interchangeable blocks which final part is shaped so as to provide beneath the advancing glass a transverse pressure distribution determining a final desired curved form of the glass.

The present invention concerns the shaping of the transition part of the bed and the provision of associated gas supply means which provide a pneumatic pressure on the upper surface of the margins of the advancing sheets of glass as they are moving over the transition block.

FIG. 1 shows pictorially the shape of the upper surface of a transition block according to the invention. Flat glass sheets which have been heated up to a temperature at which they are deformable as they are advanced over the flat initial part of the hot gas support move in the direction of arrow A onto the flat initial surface 1 of the transition block 2. The block 2 is formed with gas supply apertures 3 which are uniformly spaced over the top surface of the block and are supplied through passages formed through the thickness of the block 2 and communicating with apertures in the base plate on which the block is in intimate engagement. There is regulated escape and expansion of supporting hot gases above the upper surface of the block 2 through the apertures 3, so that a uniform gaseous support in the form of a layer of hot gas is created under the advancing glass sheets as they pass over the block 2. Gas is continuously released from the apertures 3 into the gaseous support for the glass sheets and simultaneously gas escapes from the gaseous support through exhaust apertures 4 which communicate by means of passages through the block 2 with exhaust apertures in the base plate on which the block 2 is situated. The apertures 3 are shown diagrammatically as being smaller than the apertures 4, in order to emphasise the distribution of the apertures, although in practice they are substantially the same size.

As the glass advances along the block 2 it progressively conforms to the curvature of the block due to the transverse pressure distribution in the gaseous support created by the shape of the upper surface of the block. After an initial advance over the first part of the block during which initial advance a certain amount of curvature may be imparted to the whole of the advancing sheet its margins pass under pressure headers one of which is indicated generally by the reference 5 in FIG. 1 and which are mounted over the margins of the block 2 in the manner indicated diagrammatically in FIG. 2 which omits the passages for the gas.

The pressure headers take the form illustrated in FIG. 3 and each include an exhaust chamber 6 backed by a plenum chamber 7 to which hot gas is supplied under pressure.

The lower face 8 of the exhaust chamber 6 is shaped to conform with the opposite surface 9, of the margins of the transition block 2 so that there are defined forming spaces between the plates 8 and the marginal surfaces 9 of the transition block, namely a downwardly curved space which has the desired sharp curvature to be imposed on the margins of the advancing sheet of glass 10. Hot gas supplied under pressure to each plenum chamber 7 is fed through the exhaust chamber 6 through tubes 11 whose ends which are flush with the outer surface of the plate 8 and through which hot gas is released into a gaseous cushion formed between the face of the plate 8 and the marginal part 12 of the advancing glass sheet 10.

Interspersed between the gas release apertures defined by the ends of the tubes 11 there are formed in the plate 8 a plurality of gas exhaust apertures 13 through which gas escapes from the cushion formed between the plate 8 and the marginal surface of the glass, into the exhaust chamber 6 from which the spent gas passes to atmosphere or to a duct communicating with the chamber 6 and maintained at a negative pressure.

The plates 8 and the marginal upper surface 3 of the block 2 create a continuous and downwardly directed mould for the margins of the hot glass sheet which mould is constituted by a mould cavity falling away sharply and progressively along the downstream part of the transition section of the heating apparatus.

Not only are the margins of the glass supported on gaseous supports as they pass through these marginal moulding cavities, but they are subject to an applied pneumatic pressure from above in the form of a shaped gaseous cushion created over the upper surface of the margins of the sheet.

The pressure in the gaseous cushion over the marginal upper surface of the sheet is controlled relatively to the pressure in the gaseous support beneath the sheet in such a way that the applied pneumatic pressure over the margins of the advancing sheet of glass forms them progressively into the downward curve defined by the transverse curvature of the margins of the block 2 and the curvature of the plate 8, as the sheet is advanced over the transition block 2.

That is the pneumatic pressure difference across the thickness of the glass varies over the width of the glass sheet, a greater downwardly directed pneumatic pressure difference being created across the margins than across the central area of the glass sheet so that the margins of the sheet are bent downwardly to a desired "Wrap-Around" curvature. As the glass sheet which is so bent moves off the downstream end of the transition block 2 it passes on to the part of the bed which has a transverse curvature conforming to the curvature of the downstream end 12 of the block 2 so that the curvature enforced on teh glass sheet by the effect of transverse pressure difference is consolidated during the further advance of the glass along the rest of the gaseous support, before the glass passes into the quenching station.

In the accompanying drawings the transition block 2 is a monolithic structure, but it may be formed as a laminar structure, or as a composite block built up from a plurality of blocks. For example the marginal parts of the block with the downwardly curved surface may be separate blocks abutting against the sides of a main piece forming the main body of the block. This enables the marginal curvature of the block 2 to be changed without replacing the whole of the transition block.

The glass moving over the transition block 2 may have sufficient momentum to carry it over the block and also may have a certain acceleration due to the sharp downward bending of its margins and of the effect of the upper gaseous cushions which impose downward pressure on those margins. After the glass sheet passes beyond the transition block 2 its bent edges may engage vertical rotating discs which constitute an edge drive to the glass during its advance over the final part of the bed.

The invention thus provides a novel method and apparatus for enforcing a desired sharp curvature on the margins of a glass sheet in the manufacture of a toughened glass element without any mechanical contact with the glass when it is above its deformation temperature. Thus, the invention not only provides an improved way of imposing sharp curvature on the margins of sheet for example in the production of "Wrap-Around" windscreens or rear lights but also enables such curvature to be produced at a lower temperature than is possible in the bending of glass sheets by sag bending under gravity, because of the downwardly directed pneumatic pressure progressively imposed on the upper surface of the margins of the sheets as they are advanced over the gaseous support, which pressure enforces the desired curvature on the margins of the glass before it passes to the quenching station.

I claim:

1. A method of bending glass in sheet form, comprising supporting the glass sheet on a gaseous support as it is advanced through a heating station, and bending the sheet to a desired shape by progressively imposing across the thickness of the glass sheet and along the path of advancement of the sheet as it is advanced over the support, a pneumatic pressure difference which varies across the width of the glass sheet.

2. A method according to claim 1, wherein a pneumatic pressure difference is created across the margins which is greater than that which is created across the central area of the glass sheet so that the margins of the sheet are bent downwardly to the desired shape.

3. A method of bending a glass sheet to a desired shape comprising advancing the glass sheet through heating stations along a gaseous support created under the advancing sheet, and imposing an enhanced curvature on the margins of the sheet by adapting the gaseous support to a progressive downward curve at its margins, and applying pneumatic pressure over the margins of the advancing glass sheet to force them progressively into a downward curvature conforming with the downward curve of the gaseous support as the sheet is advanced over the support.

4. A method according to claim 3, wherein after the desired shape has been enforced on the sheet, the advance of the sheet continues over an extension of the gaseous support conforming to the final shape of the sheet, to a quenching station in which the glass sheet glides over a gaseous support constituted by the quenching air supplied to the gaseous support for the glass sheet at the same time as quenching air is fed downwardly onto the upper face of the glass sheet.

5. Apparatus for transporting glass in sheet form on a gaseous support through heating stations, comprising a bed over which a gaseous support is created as a glass sheet is urged thereover, the bed having a top surface which is shaped so as to permit the glass sheet to assume a desired curvature, a part of said top surface permitting a progressive change of shape on the hot advancing sheets of glass, and having a transverse cross-section which progressively changes in such a way that there is a sharp progressive downward curvature of the surface of the bed corresponding to the desired sharp downward curve of the margins of the bent glass sheet, and gas supply means mounted above the margins of this said part of the top surface of the bed for creating cushions of gas over the upper surface of the margins of the glass sheets so as to force the margins of the glass sheet downwardly into said progressive downward curvature.

6. Apparatus according to claim 5, wherein the gas supply means comprises plates mounted above the margins of the said part of the top surface of the bed, each plate being shaped to conform to the marginal shape of the said part of the top surface of the bed so as to define between the plates and the margins of the said part of the top surface of the bed, a downwardly curved space having the desired sharp curvature to be imposed on the margins of the advancing sheet of glass, the plates being apertured for release of hot gases into a gaseous cushion which applies pneumatic pressure over the margins of the advancing glass.

References Cited

UNITED STATES PATENTS

| | | |
|---|---|---|
| 3,223,501 | 12/1965 | Fredley et al. |
| 3,231,353 | 1/1966 | Julio _____ 65—114 |
| 3,332,760 | 8/1967 | McMaster et al. |
| 3,375,093 | 3/1968 | Reising. |
| 3,402,036 | 9/1968 | McMaster. |

S. LEON BASHORE, Primary Examiner

J. H. HARMAN, Assistant Examiner

U.S. Cl. X.R.

65—182, 275, 287